(12) United States Patent
Imoto (10) Patent No.: US 10,196,030 B2
(45) Date of Patent: Feb. 5, 2019

(54) IGNITER ASSEMBLY AND GAS GENERATOR USING THE SAME

(71) Applicant: DAICEL CORPORATION, Osaka-shi, Osaka (JP)

(72) Inventor: Katsuhiro Imoto, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 15/520,320

(22) PCT Filed: Nov. 2, 2015

(86) PCT No.: PCT/JP2015/080872
§ 371 (c)(1),
(2) Date: Apr. 19, 2017

(87) PCT Pub. No.: WO2016/076149
PCT Pub. Date: May 19, 2016

(65) Prior Publication Data
US 2017/0291573 A1    Oct. 12, 2017

(30) Foreign Application Priority Data

Nov. 14, 2014  (JP) .................................. 2014-231532
Oct. 30, 2015  (JP) .................................. 2015-213617

(51) Int. Cl.
*B60R 21/264*    (2006.01)
*B60R 22/46*     (2006.01)
*B60R 21/26*     (2011.01)

(52) U.S. Cl.
CPC ........ *B60R 21/2644* (2013.01); *B60R 21/264* (2013.01); *B60R 22/4628* (2013.01);
(Continued)

(58) Field of Classification Search
CPC ... B60R 21/26; B60R 21/264; B60R 21/2644; B60R 22/4628; B60R 22/46; B60R 2021/26029; B60R 2021/2648
(Continued)

(56) References Cited

U.S. PATENT DOCUMENTS 5,140,906 A    8/1992  Little, II
5,648,634 A    7/1997  Avory et al.
(Continued)

FOREIGN PATENT DOCUMENTS

CN    1376256 A    10/2002
CN    1589390 A    3/2005
(Continued)

OTHER PUBLICATIONS

Chinese Office Action and Search Report issued in the corresponding Chinese Patent Application No. 201580061346.5 dated Sep. 4, 2018.

*Primary Examiner* — James S Bergin
(74) *Attorney, Agent, or Firm* — Birch, Stewart, Kolasch & Birch, LLP (57) ABSTRACT

The present invention provides an igniter assembly in which reliability in operation is enhanced.
An igniter assembly includes an igniter main body, a resin portion enclosing a periphery of the igniter main body, a metallic collar being arranged on a periphery of the resin portion and integrated with the resin portion, a cup-like shaped igniter housing filled therein with a gas generating agent or a transfer charge. The metallic collar includes a combination of a cylindrical collar and an annular collar, and the cup-like shaped igniter housing abuts against a portion with a reduced diameter on the side of a first end portion of the cylindrical collar, thereby being fixed from the outside.

6 Claims, 4 Drawing Sheets

(52) U.S. Cl.
CPC ..... *B60R 22/46* (2013.01); *B60R 2021/26029* (2013.01); *B60R 2021/2648* (2013.01)

(58) Field of Classification Search
USPC .......................... 102/530, 531; 280/736, 741
See application file for complete search history.

(56) References Cited

U.S. PATENT DOCUMENTS

| | | | |
|---|---|---|---|
| 6,073,963 A | 6/2000 | Hamilton et al. | |
| 6,718,884 B1 | 4/2004 | Yabuta et al. | |
| 7,370,885 B2 * | 5/2008 | Stevens | B60R 22/4633 |
| | | | 102/530 |
| 7,726,241 B2 | 6/2010 | Stevens | |
| 8,434,413 B2 * | 5/2013 | Mitsunabe | F42B 3/103 |
| | | | 102/202.12 |
| 8,590,930 B2 * | 11/2013 | Mitsunabe | C06D 5/00 |
| | | | 280/741 |
| 8,800,451 B2 * | 8/2014 | Sawada | F42B 3/107 |
| | | | 102/202.9 |
| 9,079,808 B2 * | 7/2015 | Matsuura | F42B 3/103 |
| 2003/0160437 A1 | 8/2003 | Ohji et al. | |
| 2004/0226472 A1 | 11/2004 | Oda | |
| 2004/0245753 A1 | 12/2004 | Kato et al. | |
| 2005/0009390 A1 | 1/2005 | Barker et al. | |
| 2007/0114840 A1 | 5/2007 | Briesewitz et al. | |
| 2013/0199398 A1 | 8/2013 | Mitsunabe | |

FOREIGN PATENT DOCUMENTS

| | | |
|---|---|---|
| JP | 51-23118 | 2/1976 |
| JP | 9-504599 A | 5/1997 |
| JP | 11-321541 A | 11/1999 |
| JP | 2003-34219 A | 2/2003 |
| JP | 2004-217059 A | 8/2004 |
| JP | 2007-521181 A | 8/2007 |
| JP | 2008-36609 A | 2/2008 |
| JP | 2009-513403 A | 4/2009 |
| JP | 2013-159239 A | 8/2013 |
| WO | WO 95/11421 A1 | 4/1995 |
| WO | WO 2005/008845 A1 | 1/2005 |

* cited by examiner

IGNITER ASSEMBLY AND GAS GENERATOR USING THE SAME

FIELD OF INVENTION

The present invention relates to an igniter assembly and a gas generator using the igniter assembly.

DESCRIPTION OF RELATED ART

As an igniter for a gas generator of an airbag apparatus, an igniter assembly including a combination of an igniter main body, a resin portion, a metallic collar and a housing (a casing) is used in some gas generators.

Further, the igniter assembly is also applied as a gas generator usable for a pretensioner of a seat belt of an automobile with a gas generating agent filled in the housing (the casing) (JP-A No. 2004-217059, JP-A No. 2008-36609).

In FIG. 1 of U.S. Pat. No. 7,726,241, an edge portion 60 at an opening of a casing 54 covers a shoulder 21 of a bore seal 14 from the outside, and the edge portion 60 is deformed to conform to an outer shape of the shoulder 21, so that the casing 54 is fixed to the bore seal 14.

In FIG. 1 of JP-A No. H11-321541, a housing 22 and an initiator adapter 24 are integrated by welding, the initiator adapter 24 covers an insulating material 36 and an insert member 40 from the outside, and an opening side of the initiator adapter 24 is deformed to conform to outer shapes of the insulating material 36 and the insert member 40, so that the initiator adapter 24 is fixed to the insert member 40.

In FIGS. 1 and 2 of JP-A No. 2004-217059, a cup body 20 and an igniter collar 14 are jointed to each other by a crimp case 30 which is a separate member (in Paragraph 0040).

In FIG. 1 of JP-A No. 2013-159239, a cup-like shaped case 40, which has an annular bent portion 45 at an end portion of an opening 43, is used. The cup-like shaped case 40 is fitted to an igniter 12 of an igniter assembly 11 from the opening 43 of the cup-like shaped case 40.

In FIG. 1 of JP-A No. 2008-36609, a flange 42 formed at an opening of a cup member 41 is fitted into an annular groove 33 formed in an igniter collar 31 (in Paragraph 0049).

SUMMARY OF INVENTION

The present invention (Invention 1) provides an igniter assembly, including
an igniter main body having an ignition portion and an electroconductive pin, a resin portion enclosing a periphery of the igniter main body, a metallic collar being arranged on a periphery of the resin portion and being integrated with the resin portion, and a cup-like shaped igniter housing enclosing at least the ignition portion and being filled therein with a gas generating agent or a transfer charge,
the metallic collar including a combination of a cylindrical collar and an annular collar,
the cylindrical collar including
a first inner wall surface on the side of a first end positioned on the side of the ignition portion, a second inner wall surface on the side of a second end positioned on the side of the electroconductive pin, and an inner annular step surface between the first inner wall surface and the second inner wall surface, an inner diameter of the first inner wall surface being larger than an inner diameter of the second inner wall surface, and the second inner wall surface abutting against an outer surface of the resin portion,
the annular collar including
a first annular surface, a second annular surface on the opposite side of the first annular surface in a thickness direction, an inner circumferential surface and an outer circumferential surface, part of the first annular surface and part of the second annular surface including the inner circumferential surface and a center hole being embedded in the resin portion, and the remaining part of the first annular surface and the remaining part of the second annular surface including the outer circumferential surface protruding outward in a radial direction of the resin portion,
the outer circumferential surface of the annular collar abutting against the first inner wall surface of the cylindrical collar, and the second annular surface on the side of the outer circumferential surface of the annular collar abutting against the inner annular step surface of the cylindrical collar,
the cup-like shaped igniter housing including a smaller-diameter circumferential wall portion provided on the side of a bottom surface, a larger-diameter circumferential wall portion provided on the side of an opening and being larger than the smaller-diameter circumferential wall portion, and an annular step portion between the smaller-diameter circumferential wall portion and the larger-diameter circumferential wall portion,
in the cup-like shaped igniter housing, an annular end surface at the opening abutting against the first annular surface of the annular collar, an outer surface of the larger-diameter circumferential wall portion abutting against the first inner wall surface of the cylindrical collar, and an outer surface of the annular step portion and part of an outer surface of the smaller-diameter circumferential wall portion contiguous to the outer surface abutting against a portion of the cylindrical collar where a diameter on the side of the first end is reduced, so that the cup-like shaped igniter housing is fixed from the outside.

The present invention (Invention 2) provides an igniter assembly, including
an igniter main body having an ignition portion and an electroconductive pin, a resin portion enclosing a periphery of the igniter main body, a metallic collar being arranged on a periphery of the resin portion and being integrated with the resin portion, and a cup-like shaped igniter housing enclosing at least the ignition portion and being filled therein with a gas generating agent or a transfer charge,
the metallic collar including a combination of a cylindrical collar and an annular collar,
the cylindrical collar including
a first inner wall surface on the side of a first end positioned on the side of the ignition portion, a second inner wall surface on the side of a second end positioned on the side of the electroconductive pin, and an inner annular step surface between the first inner wall surface and the second inner wall surface, an inner diameter of the first inner wall surface being larger than an inner diameter of the second inner wall surface, and the second inner wall surface abutting against an outer surface of the resin portion,
the annular collar including
a first annular surface a second annular surface on the opposite side of the first annular surface in a thickness direction, an inner circumferential surface and an outer circumferential surface, part of the first annular surface and part of the second annular surface including the inner circumferential surface and a center hole being embedded in the resin portion, and the remaining part of the first annular surface and the remaining part of the second annular surface including the outer circumferential surface protruding outward in a radial direction of the resin portion, the outer circumferential surface of the annular collar abutting against the first inner wall surface of the cylindrical collar, and the second annular surface on the side of the outer circumferential surface of the annular collar abutting against the inner annular step surface of the cylindrical collar, the cup-like shaped igniter housing including a plurality of through holes in a circumferential wall portion and a flange portion at an opening, the flange portion including a lower annular surface on the side of the opening, an upper annular surface on the opposite side of the lower annular surface in an axial direction and an annular end surface of the opening between the lower annular surface and the upper annular surface, in the cup-like shaped igniter housing, the lower annular surface abutting against the first annular surface of the annular collar, the annular end surface abutting against the first inner wall surface of the cylindrical collar, and the upper annular surface abutting against a bent portion of the cylindrical collar that is bent inward, so that the cup-like shaped igniter housing is fixed from the outside.

The gas generator according to the present invention includes the igniter assembly according to the Invention 1 or 2 described above.

BRIEF DESCRIPTION OF DRAWINGS

The present invention will become more fully understood from the detailed description given hereinbelow and the accompanying drawings which are given by way of illustration only, and thus are no limitative of the present invention and wherein.

DETAILED DESCRIPTION OF INVENTION

In the igniter assemblies, the housings (the casings) are fixed to the metallic collars (U.S. Pat. No. 7,726,241, JP-A No. H11-321541, JP-A No. 2004-217059, JP-A No. 2013-159239 and JP-A No. 2008-36609), and it is important that a fixing operation is performed easily during assembling and the housings (the casings) are not detached from the metallic collar during actuation.

The present invention provides an igniter assembly, in which fixing strength of an igniter housing is increased by fixing the igniter housing from the outside with a combination of two metallic collars, and also a gas generator using the same.

In the igniter assembly of the Invention 1, the combination of the cylindrical collar and the annular collar is used as the metallic collar.

Partial surface (the second inner wall surface) of the cylindrical collar abuts against the outer surface of a resin portion.

Partial surface including the center hole of the annular collar is embedded in and integrated with the resin portion.

The cylindrical collar and the annular collar partially abut against each other.

The cup-like shaped igniter housing is made of metal and includes the smaller-diameter circumferential wall portion on the side of the bottom surface, the larger-diameter circumferential wall portion on the side of an opening, and the annular step surface between the smaller-diameter circumferential wall portion and the larger-diameter circumferential wall portion.

In the cup-like shaped igniter housing, the annular end surface of the opening abuts against the first annular surface of the annular collar, the outer surface of the larger-diameter circumferential wall portion abuts against the first inner wall surface of the cylindrical collar, and the outer surface of the annular step portion and part of the outer surface of the smaller-diameter circumferential wall portion contiguous to the outer surface of the annular step portion abut against the portion of the cylindrical collar where a diameter on the side of the first end is reduced.

As described above, with the igniter assembly according to the Invention 1, since the igniter housing is fixed from the outside by associating the mounting positions and the shapes of the three members, i.e. the igniter housing, the cylindrical collar and the annular collar, with one another, fixing strength of the igniter housing to the metallic collar is increased.

Therefore, even when the igniter is actuated, the igniter housing is not displaced or detached from the metallic collar (the cylindrical collar and the annular collar).

In the igniter assembly of the Invention 2, the combination of the cylindrical collar and the annular collar is used as the metallic collar.

Partial surface (the second inner wall surface) of the cylindrical collar abuts against the outer surface of the resin portion.

Partial surface including the center hole of the annular collar is embedded in and integrated with the resin portion.

The cylindrical collar and the annular collar partially abut against each other.

The cup-like shaped igniter housing is made of metal and includes the plurality of through holes in the circumferential wall surface and the flange portion at the opening.

In the cup-like shaped igniter housing, the flange portion of the cup-like shaped igniter housing abuts against both the cylindrical collar and the annular collar and further abuts against the bent portion of the cylindrical collar which is bent inwardly.

As described above, with the igniter assembly according to the Invention 2, since the igniter housing is fixed from the outside by associating the mounting positions and the shapes of the three members, i.e. the igniter housing, the cylindrical collar and the annular collar, with one another, fixing strength of the igniter housing to the metallic collar is increased.

Therefore, even when the igniter is actuated, the igniter housing is not displaced or detached from the metallic collar (the cylindrical collar and the annular collar).

It is preferable in the igniter assembly of the Invention 1 or 2 that in a portion where the second annular surface on the side of the outer circumferential surface of the annular collar abuts against the inner annular step surface of the cylindrical collar, an annular groove is formed on one or both of the second annular surface and the inner annular step surface and an O-ring is fitted in the annular groove.

By forming the annular groove and fitting the O-ring therein in this manner, moisture is prevented from penetrating into the igniter housing from a gap between the cylindrical collar and the resin portion.

It is preferable in the igniter assembly of the Invention 1 or 2 that the cup-like shaped igniter housing includes a cylinder and a lid for closing one opening of the cylinder.

The igniter housing has a cup-like shape. A housing originally formed in a cup-like shape, or a housing formed into a cup-like shape by assembling can be used.

When using a housing including a cylinder and a lid as the cup-like shaped igniter housing, the cylinder is first fixed to the metallic collar (the cylindrical collar and the annular collar), a transfer charge or a gas generating agent is then charged from an opening, and thereafter the opening is closed by the lid.

As described above, the housing including the cylinder and the lid is preferably used as the cup-like shaped igniter housing, and thereby, assembly operations is facilitated.

Further, it is preferable that the gas generator of the present invention is a gas generator including two igniter assemblies capable of being independently actuated, wherein the igniter assembly to be actuated first among the two igniter assemblies is the igniter assembly of the Invention 1 or 2 described above.

Actuation of a gas generator, which has two igniter assemblies capable of being independently actuated, includes the following actuation manners:

a first actuation manner in which one igniter is actuated first, and the other igniter is actuated with a delay;

a second actuation manner in which both igniters are actuated at the same time; and a third actuation manner in which only one of the igniters is actuated.

In the first actuation manner, if an abnormal actuation occurs with the igniter (the igniter assembly) which is ignited first, such as that the igniter housing is detached from the metallic collar, the actuation of the igniter (the igniter assembly) which is actuated with a delay is adversely affected, and a normal operation of the gas generator cannot be obtained.

In the igniter assemblies according to the Invention 1 and the Invention 2 which are used in the gas generator according to the present invention, since the igniter housing is prevented from detaching from the metallic collar, a no mal operation of the gas generator are ensured.

With the igniter assembly according to the present invention, the igniter housing is fixed from the outside by the metallic collar, and thereby, the igniter housing is not detached from the metallic collar during actuation.

In a gas generator using the igniter assembly according to the present invention, reliability as a product is further improved.

The igniter assembly according to the present invention can be used as an igniter of a gas generator used in an airbag apparatus mounted to an automobile.

EMBODIMENTS OF THE INVENTION

Figure 1:
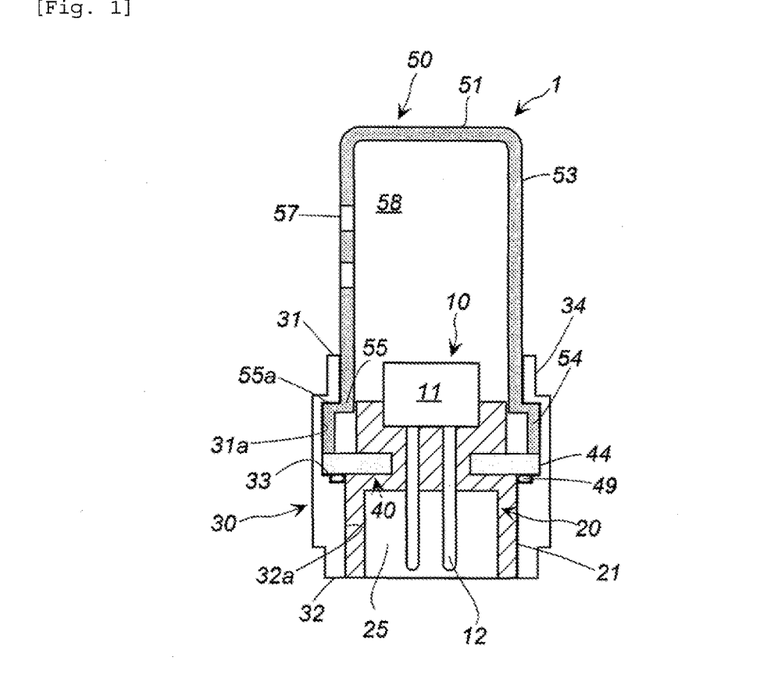
FIG. 1 shows an axial cross-sectional view showing an embodiment of an igniter assembly according to the present invention (the Invention 1)

First Igniter Assembly Depicted in FIG. 1

An igniter assembly 1 depicted in FIG. 1 includes an igniter main body 10, a resin portion 20, a metallic collar and a cup-like shaped igniter housing 50.

The igniter main body 10 includes an ignition portion 11 and an electroconductive pin 12, which is the same as known igniters of gas generators. The electroconductive pin 12 is connected to a connector having a lead wire, which is not depicted in the drawings. The inside of the ignition portion 11 is filled with an ignition charge.

Part of the ignition portion 11 and part of the electroconductive pin 12 of the igniter main body 10 are enclosed by the columnar resin portion 20. The resin portion 20 is made of a thermoplastic resin or the like and forms an electrically insulated portion and an insertion space 25 for the connector.

In the igniter assembly 1 depicted in FIG. 1, a metallic collar, which includes a combination of a cylindrical collar 30 and an annular collar 40, is used. The cylindrical collar 30 and the annular collar 40 are made of a metal such as iron or stainless steel.

In the cylindrical collar 30, an inner diameter of a first inner wall surface 31*a* on the side of a first end 31 positioned on the side of the ignition portion 11 is larger, and an inner diameter of a second inner wall surface 32*a* on the side of a second end 32 positioned on the side of the electroconductive pin 12 is smaller.

A difference in inner diameter between the first inner wall surface 31*a* and the second inner wall surface 32*a* provides an inner annular step surface 33 therebetween.

In the cylindrical collar 30, the second inner wall surface 32*a* abuts against an outer surface 21 of the resin portion 20.

Figure 2:
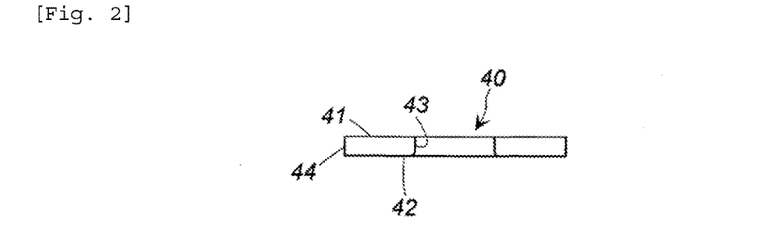
FIG. 2 shows a cross-sectional view in a thickness direction of an annular collar used in the igniter assembly depicted in FIG. 1.

As depicted in FIG. 2, the annular collar 40 includes a first annular surface 41, a second annular surface 42 on the opposite side of the first annular surface 41 in a thickness direction, an inner circumferential surface 43 and an outer circumferential surface 44.

A spacing (an inner diameter of a center hole) of the inner circumferential surface 43 of the annular collar 40 is set smaller than an outer diameter of the ignition portion 11.

In the annular collar 40, part of the first annular surface 41 and part of the second annular surface 42 including the inner circumferential surface 43 and the center hole are embedded in the resin portion 20, and the remaining part of the first annular surface 41 and the remaining part of the second annular surface 42 including the outer circumferential surface 44 protrude outward in a radial direction of the resin portion 20.

The annular collar 40 may include one or two or more annular grooves on each of the first annular surface 41 and the second annular surface 42 embedded in the resin portion 20. When the annular grooves are provided, resin penetrates into the annular grooves. Preferably, a single annular groove is provided in the first annular surface 41 and the second annular surface 42 respectively.

A depth of the annular groove is preferably equal to or less than ⅓ of a thickness of the annular collar 40.

When the annular groove is formed in the first annular surface 41 and the second annular surface 42 respectively, it is preferable that the respective grooves are formed not to face each other in a thickness direction, in order to maintain strength of the annular collar 40. For example, a distance of the annular groove in the first annular surface 41 from the inner circumferential surface 43 is made different from the distance of the annular groove in the second annular surface 42 from the inner circumferential surface 43. Thereby, the respective grooves are located not to face each other in the thickness direction.

Such annular grooves are preferably provided because the resin penetrates into the annular grooves to increase joining strength between the resin portion 20 and the annular collar 40 and to prevent the annular collar 40 from rotating.

The outer circumferential surface 44 of the annular collar 40 abuts against the first inner wall surface 31a of the cylindrical collar 30, and the second annular surface 42 on the side of the outer circumferential surface 44 of the annular collar 40 abuts against the inner annular step surface 33 of the cylindrical collar 30.

Part of the inner annular step surface 33 in abutment with the second annular surface 42 on the side of the outer circumferential surface 44 of the annular collar 40 is cut out annularly. The cutout portion, the resin portion 20 and the second annular surface 42 form an annular space, and an O-ring 49 is fitted therein.

By fitting the O-ring 49 therein, moisture is prevented from penetrating between the resin portion 20 and the second inner wall surface 32a of the cylindrical collar 30 and entering the igniter housing 50.

Figure 3:
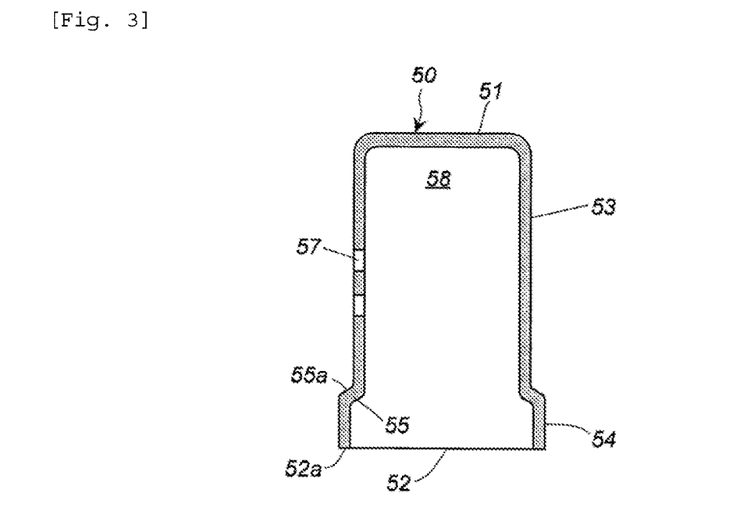
FIG. 3 shows an axial cross-sectional view of an igniter housing used in the igniter assembly depicted in FIG. 1.

As depicted in FIG. 3, the cup-like shaped igniter housing 50 includes a smaller-diameter circumferential wall portion 53 on the side of a bottom 51, a larger-diameter circumferential wall portion 54 on the side of an opening 52 and an annular step portion 55 between the smaller-diameter circumferential wall portion 53 and the larger-diameter circumferential wall portion 54.

The cup-like shaped igniter housing 50 is made of a metal such as iron or stainless steel. Moreover, the smaller-diameter circumferential wall portion 53 of the cup-like shaped igniter housing 50 has a uniform outer diameter, but the smaller-diameter circumferential wall portion 53 may have a different outer diameter partially.

The smaller-diameter circumferential wall portion 53 includes a plurality of through holes 57.

In the cup-like shaped igniter housing 50, an annular end surface 52a of the opening 52 abuts against the first annular surface 41 of the annular collar 40, and an outer surface of the larger-diameter circumferential wall portion 54 abuts against the first inner wall surface 31a of the cylindrical collar 30.

Further, in the cup-like shaped igniter housing 50, an outer surface 55a of the annular step portion 55 and part of an outer surface of the smaller-diameter circumferential wall portion 53 contiguous to the outer surface 55a are pressed from the outside by a portion (a reduced-diameter portion) 34 of an inner wall surface where a diameter is reduced on the side of the first end 31 of the cylindrical collar 30, so that the igniter housing 50 is fixed.

An internal space 58 is filled with a gas generating agent or a transfer charge.

The cup-like shaped igniter housing 50 can be a housing originally formed in a cup-like shape, or a cup-like shaped housing including a cylinder and a lid, for closing one of the openings of the cylinder, which are assembled together.

An assembling method of the igniter assembly 1 depicted in FIG. 1 will now be described.

An article obtained by integrating the igniter main body 10 with the resin portion 20 and the annular collar 40 is prepared. Such an integrated article is manufactured by employing a known resin molding method (for example, an insert molding method).

The O-ring 49 is fitted into the resin portion 20 of the igniter and the igniter main body 10 is fitted into the cylindrical collar 30, such that the second inner wall surface 32a abuts against the outer surface 21 (a radially outer side surface of the insertion space 25 for the connector) of the resin portion 20. At this point, the reduced-diameter portion 34 is not yet formed.

Next, the resultant article is combined with the igniter housing 50 as depicted in FIG. 1 while the igniter housing 50, which is filled with a gas generating agent or a transfer charge, is placed on the downside.

Next, by applying force inwardly to the cylindrical collar 30 on the side of the first end 31 (for example, by hitting the collar from the outside), the reduced-diameter portion 34 as depicted in FIG. 1 is formed, and thereby, the igniter housing 50 is fixed from the outside.

When an igniter housing including a cylinder and a lid is used as the igniter housing 50, such a method can be employed that only the cylinder of the igniter housing 50 is fixed, the internal space 58 is then filled with a gas generating agent or a transfer charge and thereafter, the opening is closed by the lid.

The igniter assembly 1 depicted in FIG. 1 is used as an igniter (an igniter assembly) to be used in a gas generator, and can be also used as a gas generator. For example, the igniter assembly 1 can be used as a gas generator for a pretensioner of a seat belt of an automobile disclosed in JP-A No. 2004-217059 and JP-A No. 2008-36609.

Figure 4:
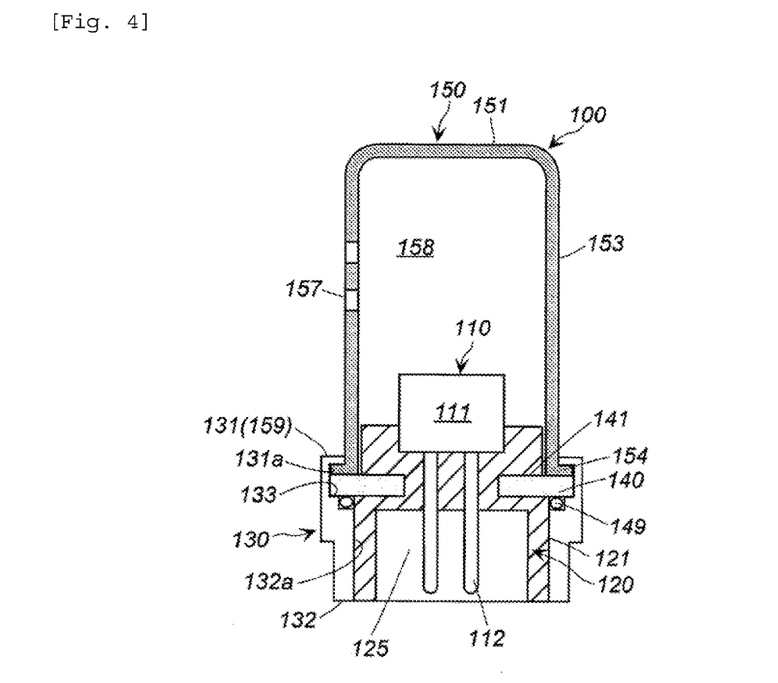
FIG. 4 shows an axial cross-sectional view showing another embodiment of an igniter assembly according to the present invention (the Invention 2)

Second Igniter Assembly Depicted in FIG. 4

An igniter assembly 100 depicted in FIG. 4 includes an igniter main body 110, a resin portion 120, a metallic collar and a cup-like shaped igniter housing 150.

The igniter main body 110 includes an ignition portion 111 and an electroconductive pin 112, which is the same as known igniters of gas generators. The electroconductive pin 112 is connected to a connector having a lead wire, which is not depicted in the drawing. The inside of the ignition portion 111 is filled with an ignition charge.

Part of the ignition portion 111 and part of the electroconductive pin 112 of the igniter main body 110 are enclosed by the columnar resin portion 120. The resin portion 120 is made of a thermoplastic resin or the like and forms an electrically insulated portion and an insertion space 125 for the connector.

In the igniter assembly 100 depicted in FIG. 4, a metallic collar, which includes a combination of a cylindrical collar 130 and an annular collar 140, is used. The cylindrical collar 130 and the annular collar 140 are made of a metal such as iron or stainless steel.

In the cylindrical collar 130, an inner diameter of a first inner wall surface 131a on the side of a first end 131 positioned on the side of the ignition portion 111 is larger, and an inner diameter of a second inner wall surface 132a on the side of a second end 132 positioned on the side of the electroconductive pin 112 is smaller.

A difference in inner diameter between the first inner wall surface 131a and the second inner wall surface 132a provides an inner annular step surface 133 therebetween.

In the cylindrical collar 130, the second inner wall surface 132a abuts against an outer surface 121 of the resin portion 120, which radially faces the insertion space 25 for the connector.

Figure 5:
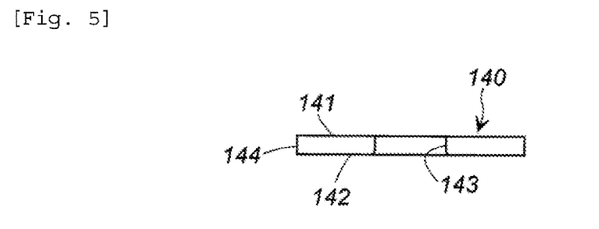
FIG. 5 shows a cross-sectional view in a thickness direction of an annular collar used in the igniter assembly depicted in FIG. 4.

As depicted in FIG. 5, the annular collar 140 includes a first annular surface 141, a second annular surface 142 on the opposite side of the first annular surface 141 in a thickness direction, an inner circumferential surface 143 and an outer circumferential surface 144.

A spacing (an inner diameter of a center hole) of the inner circumferential surface 143 of the annular collar 140 is set smaller than an outer diameter of the ignition portion 111.

In the annular collar 140, part of the first annular surface 141 and part of the second annular surface 142 including the inner circumferential surface 143 and the center hole are embedded in the resin portion 120, and the remaining part of the first annular surface 141 and the remaining part of the second annular surface 142 including the outer circumferential surface 144 protrude outward in a radial direction of the resin portion 120.

The annular collar 140 may include one or two or more (preferably one) annular grooves on each of the first annular surface 141 and the second annular surface 142.

A depth of the annular groove is preferably equal to or less than ⅓ of a thickness of the annular collar 140.

When the annular groove is formed in the first annular surface 141 and the second annular surface 142 respectively, it is preferable that the respective grooves are faulted not to face each other in a thickness direction, in order to maintain a strength of the annular collar 140. For example, a distance of the annular groove in the first annular surface 141 from the inner circumferential surface 143 is made different from the distance of the annular groove in the second annular surface 142 from the inner circumferential surface 143. Thereby, the respective annular grooves are located not to face each other in the thickness direction.

Such annular grooves are preferably provided because the resin penetrates into the annular grooves to increase a joining strength between the resin portion 120 and the annular collar 140 and to prevent the annular collar 140 from rotating.

The outer circumferential surface 144 of the annular collar 140 abuts against the first inner wall surface 131a of the cylindrical collar 130, and the second annular surface 142 on the side of the outer circumferential surface 144 of the annular collar 140 abuts against the inner annular step surface 133 of the cylindrical collar 130.

Part of the inner annular step surface 133 in abutment with the second annular surface 142 is cut out annularly. The cutout portion, the resin portion 120 and the second annular surface 142 form an annular space, and an O-ring 149 is fitted therein. Here, the annular space for fitting the O-ring 149 can be, for example, an annular groove such as the second annular groove 146 fainted in the second annular surface 142 abutting against the inner annular step surface 133.

By fitting the O-ring 149 therein, moisture is prevented from penetrating between the resin portion 120 and the second inner wall surface 132a of the cylindrical collar 130 and entering the igniter housing 150.

Figure 6:
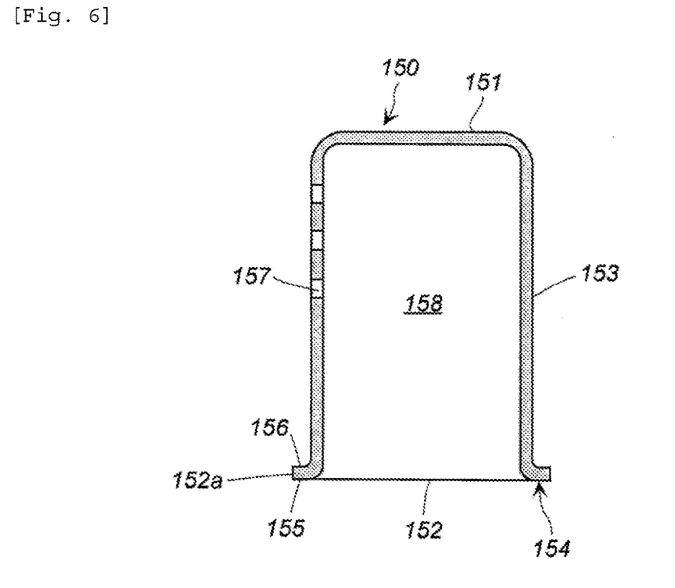
FIG. 6 shows an axial cross-sectional view of an igniter housing used in the igniter assembly depicted in FIG. 4.

As depicted in FIG. 6, the cup-like shaped igniter housing 150 includes a bottom 151, a circumferential wall 153, an opening 152 which is axially opposed to the bottom 151, and a flange 154 at the opening 152.

The cup-like shaped igniter housing 150 is made of a metal such as iron or stainless steel.

The circumferential wall portion 153 of the cup-like shaped igniter housing 150 has a uniform outer diameter, but the circumferential wall portion 153 may have a different outer diameter partially. For example, an outer diameter on the side of the bottom 151 may be larger than an outer diameter on the side of the opening 152, or the outer diameter on the side of the bottom 151 may be smaller than the outer diameter on the side of the opening 152.

The circumferential wall portion 153 includes a plurality of through holes 157.

The flange portion 154 includes a lower annular surface 155 on the side of the opening 152, an upper annular surface 156 on the axially opposite side of the lower annular surface 155, and an annular end surface 152a of the opening 152 between the lower annular surface 155 and the upper annular surface 156.

In the cup-like shaped igniter housing 150, the lower annular surface 155 abuts against the first annular surface 141 of the annular collar 140, the annular end surface 152a abuts against the first inner wall surface 131a of the cylindrical collar 130, and the upper annular surface 156 is pressed from the outside by a bent portion 159 which is obtained by bending inward the first end 131 of the cylindrical collar 130, and thereby, the igniter housing 150 is fixed.

An internal space 158 is filled with a gas generating agent or a transfer charge (not depicted in the drawings) and a cushion material can be arranged on the inner side of the bottom 151 if necessary. Moreover, a cushion material can also be used in the igniter assembly 1 depicted in FIG. 1 if necessary.

The cup-like shaped igniter housing 150 can be a housing originally formed in a cup-like shape, or a cup-like shaped housing including a cylinder and a lid, for closing one of the openings of the cylinder, which are assembled together.

An assembling method of the igniter assembly 100 depicted in FIG. 4 will now be described.

An article obtained by integrating the igniter main body 110, the resin portion 120 and the annular collar 140 is prepared. Such an integrated article is manufactured by employing a known resin molding method (for example, an insert molding method).

The cylindrical collar 130 and the O-ring 149 are fitted together to the integrated article such that the second inner wall surface 132a abuts against the outer surface 121 (a radially outer side surface of the insertion space 125 for the connector) of the resin portion 120. At this point, the bent portion 159 is not yet formed.

Next, the resultant article is combined with the igniter housing 150 as depicted in FIG. 4 while the igniter housing 150, which is filled with a gas generating agent or a transfer charge, is placed on the downside.

Next, by applying force inwardly to the cylindrical collar 130 on the side of the first end 131 (for example, by hitting the collar from the outside), the bent portion 159 as depicted in FIG. 4 is famed, and thereby, the igniter housing 150 is fixed from the outside.

When an igniter housing including a cylinder and a lid is used as the igniter housing 150, such a method can be employed that only the cylinder of the igniter housing 150 is fixed, the internal space 158 is then filled with a gas generating agent or a transfer charge and thereafter, the opening is closed by the lid.

The igniter assembly 100 depicted in FIG. 4 is used as an igniter (an igniter assembly) to be used in a gas generator, and can be also used as a gas generator. For example, the igniter assembly 100 can be used as a gas generator for a pretensioner of a seat belt of an automobile disclosed in JP-A No. 2004-217059 and JP-A No. 2008-36609.

Figure 7:
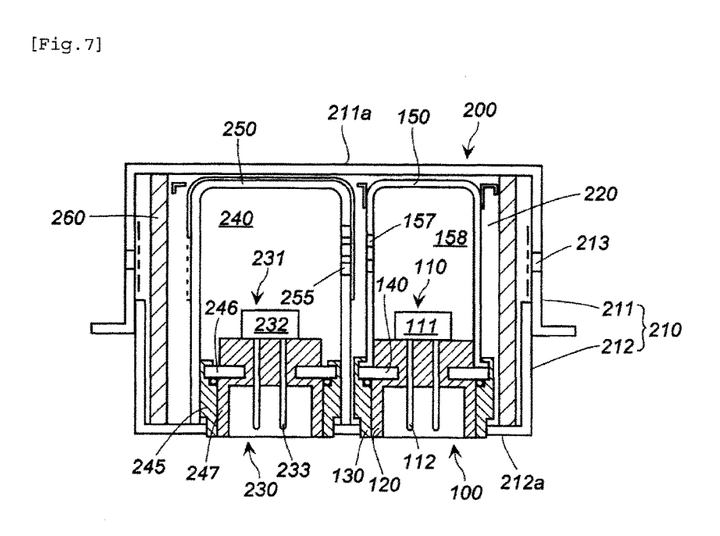
FIG. 7 shows an axial cross-sectional view of a gas generator using the igniter assembly depicted in FIG. 4.

Gas Generator Depicted in FIG. 7

Next, a gas generator 200, in which the igniter assembly 100 depicted in FIG. 4 is used, will be described. The gas generator 200 is the same as known gas generators except that the igniter assembly 100 depicted in FIG. 4 is used as a first igniter.

A housing 210 is formed by integrating a diffuser shell 211 with a closure shell 212 by welding.

A plurality of gas discharge ports 213 closed from the inside by a seal tape are provided in a circumferential wall surface of the diffuser shell 211.

A first igniter in which the igniter assembly 100 depicted in FIG. 4 is used, is arranged inside the housing 210.

The cylindrical collar 130 of the igniter assembly (the first igniter) 100 is fitted into an opening formed in a bottom portion 212a of the closure shell 212 and is welded and fixed in an abutting portion.

Further, a second combustion chamber 240 is formed at a position adjacent to the igniter assembly 100 in a radial direction inside the housing 210.

The second combustion chamber 240 has a second igniter 230 and a second gas generating agent (not depicted in the drawing) which are accommodated inside a second combustion chamber housing 250.

The second combustion chamber housing 250 has a plurality of second through holes 255 formed in a circumferential wall, and a cushion material may be arranged in a bottom portion.

The second igniter 230 includes a combination of a second igniter main body 231, which includes a second ignition portion 232 and a second electroconductive pin 233, a second resin portion 247, a second annular collar 246 and a second cylindrical collar 245.

The second combustion chamber housing 250 is fixed by being press-fitted to an outer circumferential surface of the second cylindrical collar 245 from the opening.

The second cylindrical collar 245 of the second igniter 230 is fitted into an opening formed in the bottom portion 212a of the closure shell 212 and is welded and fixed in an abutting portion.

A cylindrical filter 260 is arranged inside the housing 210 at an interval from the gas discharge ports 213.

A space inside the housing 210 excluding the igniter assembly 100 and the second combustion chamber 240 and further inside the cylindrical filter 260 corresponds to a first combustion chamber 220. The first combustion chamber 220 is filled with a first gas generating agent (not depicted in the drawing).

Next, an operation when the gas generator 200 depicted in FIG. 7 is used in an airbag apparatus of an automobile will be described. The following describes the case in which the first igniter (the first igniter assembly) 100 is actuated first and the second igniter 230 is actuated with a delay.

When the igniter main body 110 is actuated, flames, a combustion gas or the like is generated from the ignition portion 111 to ignite and burn the gas generating agent (or the transfer charge) filled in the internal space 158, and a combustion gas or the like is generated.

The combustion gas generated inside the internal space 158 enters the first combustion chamber 220 from the through holes 157, ignites and burns the first gas generating agent, and generates a combustion gas.

The combustion gas generated in the first combustion chamber 220 passes through the cylindrical filter 260 and is discharged from the gas discharge ports 213 to inflate an airbag.

The second igniter 230 is actuated with a slight delay from the actuation of the first igniter 100, flames, a combustion gas or the like is generated to ignite and burn the second gas generating agent in the second combustion chamber 240, and a combustion gas is generated.

The combustion gas inside the second combustion chamber 240 enters the first combustion chamber 220 from the second through holes 255, passes through the cylindrical filter 260, and is discharged from the gas discharge ports 213 to further inflate the airbag.

In such an operation process, when the actuation of the igniter main body 110 increases pressure inside the internal space 158 and the igniter housing 150 is detached and collides with a top plate 211a, it is conceivable that combustion of the first gas generating agent in the first combustion chamber 220 and combustion of the second gas generating agent in the second combustion chamber 240 may be adversely affected.

However, with the first igniter (the first igniter assembly) 100 used in the gas generator 200 depicted in FIG. 7, the igniter housing 150 is fixed from the outside by the metallic collar, and thereby the igniter housing 150 is not detached during actuation, which further improves the product reliability.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An igniter assembly, comprising
an igniter main body having an ignition portion and an electroconductive pin, a resin portion enclosing a periphery of the igniter main body, a metallic collar being arranged on a periphery of the resin portion and being integrated with the resin portion, and a cup-like shaped igniter housing enclosing at least the ignition portion and being filled therein with a gas generating agent or a transfer charge,
the metallic collar including a combination of a cylindrical collar and an annular collar,
the cylindrical collar including
a first inner wall surface on the side of a first end positioned on the side of the ignition portion, a second inner wall surface on the side of a second end positioned on the side of the electroconductive pin, and an inner annular step surface between the first inner wall surface and the second inner wall surface, an inner diameter of the first inner wall surface being larger than an inner diameter of the second inner wall surface, and the second inner wall surface abutting against an outer surface of the resin portion,
the annular collar including
a first annular surface, a second annular surface on the opposite side of the first annular surface in a thickness direction, an inner circumferential surface and an outer circumferential surface, part of the first annular surface and part of the second annular surface including the inner circumferential surface and a center hole being embedded in the resin portion, and the remaining part of the first annular surface and the remaining part of the second annular surface including the outer circumferential surface protruding outward in a radial direction of the resin portion,
the outer circumferential surface of the annular collar abutting against the first inner wall surface of the cylindrical collar, and the second annular surface on the side of the outer circumferential surface of the annular collar abutting against the inner annular step surface of the cylindrical collar,
the cup-like shaped igniter housing including a smaller-diameter circumferential wall portion provided on the side of a bottom surface, a larger-diameter circumferential wall portion provided on the side of an opening and being larger than the smaller-diameter circumferential wall portion, and an annular step portion between the smaller-diameter circumferential wall portion and the larger-diameter circumferential wall portion, in the cup-like shaped igniter housing, an annular end surface at the opening abutting against the first annular surface of the annular collar, an outer surface of the larger-diameter circumferential wall portion abutting against the first inner wall surface of the cylindrical collar, and an outer surface of the annular step portion and part of an outer surface of the smaller-diameter circumferential wall portion contiguous to the outer surface abutting against a portion of the cylindrical collar where a diameter on the side of the first end is reduced, so that the cup-like shaped igniter housing is fixed from the outside.

2. The igniter assembly according to claim 1, wherein in a portion where the inner annular step surface of the cylindrical collar and the second annular surface on the side of the outer circumferential surface of the annular collar abut against each other, an annular groove is framed on one or both of the inner annular step surface and the second annular surface and an O-ring is fitted in the annular groove.

3. The igniter assembly according to claim 1, wherein the cup-like shaped igniter housing includes a cylinder and a lid for closing one opening of the cylinder.

4. A gas generator including the igniter assembly according to claim 1.

5. A gas generator including two igniter assemblies capable of being independently actuated, wherein the igniter assembly to be actuated first among the two igniter assemblies is the igniter assembly according to claim 1.

6. An igniter assembly, comprising
an igniter main body having an ignition portion and an electroconductive pin, a resin portion enclosing a periphery of the igniter main body, a metallic collar being arranged on a periphery of the resin portion and being integrated with the resin portion, and a cup-like shaped igniter housing enclosing at least the ignition portion and being filled therein with a gas generating agent or a transfer charge,
the metallic collar including a combination of a cylindrical collar and an annular collar,
the cylindrical collar including
a first inner wall surface on the side of a first end positioned on the side of the ignition portion, a second inner wall surface on the side of a second end positioned on the side of the electroconductive pin, and an inner annular step surface between the first inner wall surface and the second inner wall surface, an inner diameter of the first inner wall surface being larger than an inner diameter of the second inner wall surface, and the second inner wall surface abutting against an outer surface of the resin portion,
the annular collar including
a first annular surface, a second annular surface on the opposite side of the first annular surface in a thickness direction, an inner circumferential surface and an outer circumferential surface, part of the first annular surface and part of the second annular surface including the inner circumferential surface and a center hole being embedded in the resin portion, and the remaining part of the first annular surface and the remaining part of the second annular surface including the outer circumferential surface protruding outward in a radial direction of the resin portion,
the outer circumferential surface of the annular collar abutting against the first inner wall surface of the cylindrical collar, and the second annular surface on the side of the outer circumferential surface of the annular collar abutting against the inner annular step surface of the cylindrical collar,
the cup-like shaped igniter housing including a plurality of through holes in a circumferential wall portion and a flange portion at an opening,
the flange portion including a lower annular surface on the side of the opening, an upper annular surface on the opposite side of the lower annular surface in an axial direction and an annular end surface of the opening between the lower annular surface and the upper annular surface,
the lower annular surface abutting against the first annular surface of the annular collar, the annular end surface abutting against the first inner wall surface of the cylindrical collar, and the upper annular surface abutting against a bent portion of the cylindrical collar that is bent inward, so that the cup-like shaped igniter housing is fixed from the outside.

* * * * *